(12) United States Patent  
Love

(10) Patent No.: US 7,472,935 B2  
(45) Date of Patent: Jan. 6, 2009

(54) IMPACT DISPERSAL DEVICE

(76) Inventor: Phillip W Love, P.O. Box 493, Smithville, TN (US) 37166

( * ) Notice: Subject to any disclaimer, the term of this patent is extended or adjusted under 35 U.S.C. 154(b) by 439 days.

(21) Appl. No.: 11/380,541

(22) Filed: Apr. 27, 2006

(65) Prior Publication Data

US 2006/0249340 A1    Nov. 9, 2006

Related U.S. Application Data

(60) Provisional application No. 60/677,147, filed on May 3, 2005.

(51) Int. Cl.
- B60N 2/42 (2006.01)
- B60R 19/02 (2006.01)
- B60R 22/24 (2006.01)
- B64C 25/00 (2006.01)
- F16F 9/34 (2006.01)

(52) U.S. Cl. ............... 293/134; 296/68.1; 297/216.13; 293/107; 244/104 FP; 188/266.2; 280/806

(58) Field of Classification Search ............ 296/68.1; 297/216.1, 216.13, 216.14; 293/134, 107, 293/132; 244/104 FP; 188/266.2, 371; 280/806

See application file for complete search history.

(56) References Cited

U.S. PATENT DOCUMENTS

| | | |
|---|---|---|
| 3,344,894 A | 10/1967 | Kenworthy |
| 3,592,485 A | 7/1971 | Buhl |
| 3,677,595 A | 7/1972 | Hamilton |
| 3,731,770 A | 5/1973 | Bindon |
| 3,756,643 A | 9/1973 | Weed |
| 3,873,075 A | 3/1975 | Pamer |
| 3,947,061 A | 3/1976 | Ellis |
| 4,056,040 A | 11/1977 | Fussangel |
| 4,190,239 A | 2/1980 | Schwankhart |
| 4,326,733 A | 4/1982 | Rubalcava |
| 4,718,325 A | 1/1988 | Shore |
| 5,094,407 A | 3/1992 | Jampy |
| 5,096,026 A | 3/1992 | Vautour |
| 5,096,242 A | 3/1992 | Chin-Hun |
| 5,286,138 A | 2/1994 | Goodwin |
| 5,290,089 A | 3/1994 | Oleszko |
| 5,337,560 A | 8/1994 | Abdelmalek |
| 5,370,429 A | 12/1994 | Reuber |
| 5,454,622 A | 10/1995 | Demopoulos |
| 5,722,722 A | 3/1998 | Massars |
| 5,836,647 A | 11/1998 | Turman |
| 6,050,637 A | 4/2000 | Haland |

(Continued)

Primary Examiner—Joseph D Pape  
(74) Attorney, Agent, or Firm—Knox Patents; Thomas A. Kulaga

(57) ABSTRACT

An apparatus for impact dispersal of a force applied to a vehicle, such as a motor vehicle or other carrier. The apparatus includes a hydraulic cylinder in fluid communication with a relief valve and a flow restrictor connected in series. The piston rod of each cylinder receives the force of an impact, which causes the fluid in the cylinder to undergo an increase in pressure, which is relieved by multiple relief valves and serially connected flow restrictors. In one embodiment, the relief valves and the flow restrictors are incorporated into a single valve. The system responds to an amount of force caused by an impact and disperses the force accordingly at a controlled rate. Applications for such an embodiment include connection to vehicle bumpers, to a seat back where the cylinder is double-acting, and to landing feet for air-drop carriers.

31 Claims, 7 Drawing Sheets

U.S. PATENT DOCUMENTS

| | | |
|---|---|---|
| 6,312,027 B1 | 11/2001 | Yang |
| 6,334,643 B1 | 1/2002 | Lindblad |
| 6,386,345 B1 | 5/2002 | Hamilton |
| 6,416,127 B1 | 7/2002 | Galbreath |
| 6,435,578 B1 | 8/2002 | Li |
| 7,226,105 B2 | 6/2007 | Christopher |
| 2005/0088006 A1 | 4/2005 | Christopher |

IMPACT DISPERSAL DEVICE

CROSS-REFERENCE TO RELATED APPLICATIONS

This Application claims the benefit of provisional application Ser. No. 60/677,147, filed May 3, 2005.

STATEMENT REGARDING FEDERALLY SPONSORED RESEARCH OR DEVELOPMENT

Not Applicable

BACKGROUND OF THE INVENTION

1. Field of Invention

This invention pertains to an impact dispersal system. More particularly, this invention pertains to impact dispersal of an external force applied to a vehicle or other object.

2. Description of the Related Art

In today's fast paced society, there are sudden stops and unexpected impacts. When these sudden stops and impacts involve vehicles or other massive objects, injury and/or equipment damage is likely. Various attempts have been made to minimize the damage due to such impacts.

For example, U.S. Pat. No. 3,677,595, titled "Automobile Bumper," issued on Jul. 18, 1972, discloses a bumper that is hydraulically extended by actuation of an electric switch connected to the brake pedal of a vehicle. The switch connects the power steering system to hydraulic cylinders that extend the bumper away from the vehicle. Upon an impact of the extended bumper, the pressure in the hydraulic cylinders is relieved by a pressure relief valve that allows the hydraulic fluid to return to the power steering system.

U.S. Pat. No. 3,947,061, titled "Extensible vehicle bumper," issued on Mar. 30, 1976, discloses a motor vehicle bumper that is operated by hydraulic slave cylinders connected to the master brake cylinder to extend the bumper upon the application of a predetermined amount of force to the brake to provide the bumper with a greater shock absorbing length of travel under collision conditions. A spring forces the extended bumper to return to a non-extended position. Upon impact, the hydraulic pressure is relieved through a valve returning the hydraulic fluid to the brake system.

U.S. Pat. No. 5,096,242, titled "Shock-absorbing bumper system," issued on Mar. 17, 1992, discloses a brake-actuated shock-absorbing bumper system for an automotive vehicle. The shock-absorbing bumper system includes a supply subsystem 1 for supplying pressurized working fluid, a pressure-balancing subsystem 2, a switching subsystem 3, front and rear bumper subsystems 4 and 4', a feedback subsystem 5, a safety-control subsystem 6, and a conduit system having a plurality of oil paths for connecting subsystems 1, 2, 3, 4, 4', 5, and 6. In one embodiment, illustrated in FIGS. 6 and 6A, the bumper 41, after being subject to an impact, has a working fluid within a second chamber 45 that absorbs a portion of the impact, a spring 47 that absorbs a portion of the impact, and a receiving space 481 that receives the cylinder 40 after a shear pin 43 breaks. U.S. Pat. No. 6,312,027, titled :Shock absorbing system for an automotive vehicle," issued on Nov. 6, 2001, is a later-issued patent by the same inventor that discloses a shock absorbing system for an automotive vehicle with additional features.

U.S. Pat. No. 5,286,138, titled "Vehicle positioning methods and apparatus with impact damper," issued on Feb. 15, 1994, discloses a pair of hydraulic cylinders 68, 69 having a check valve 108 in parallel with a needle valve 109 connected to the hydraulic cylinder 68, 69. The check valve 108 allows for filling the hydraulic cylinder 68, 69 without subsequent escape of the fluid, and the needle valve 109 allows hydraulic fluid to bleed from the cylinder 68, 69, which results in a slow retraction of the pistons 72, 73.

U.S. Pat. No. 5,370,429, titled "Bumper system having an extendable bumper for automotive vehicles," issued on Dec. 6, 1994, discloses a hydraulic cylinder connected to a vehicle bumper, with the bumper being extended from the vehicle in response to conditions indicative of an imminent accident. In one embodiment, the cylinder includes a groove with a decreasing opening corresponding to the amount of retraction of the cylinder. The groove with the variable sized opening changes the impact resistance based on the amount of extension of the bumper.

U.S. Pat. No. 6,435,578, titled "Energy dissipating device for an automobile bumper," issued on Aug. 20, 2002, discloses a hollow rod piston 2, 10 that selectively closes damping holes 6, 14 as the hydraulic cylinder, or energy dissipater, 3, 11 dissipates the energy from an impact.

BRIEF SUMMARY OF THE INVENTION

According to one embodiment of the present invention, an impact dispersal system is provided. In one embodiment, the impact dispersal system includes a hydraulic cylinder in fluid communication with at least one flow restrictor that limits the rate at which the fluid in the cylinder can escape the cylinder when the piston rod of the cylinder is subjected to an impact. Other embodiments include a relief valve between the hydraulic cylinder and the flow restrictor and a catch tank for receiving the fluid from the flow restrictor.

The hydraulic cylinder has a piston connected to a shaft. The shaft is adapted to receive shock or impact loads and to transfer those loads to the piston such that the hydraulic fluid in the cylinder is pressurized by the load and bleeds out at a controlled rate, with the device thereby dispersing the energy from the impact.

The impact dispersal system is adapted to be used in vehicles, such as a motor vehicle in which the impact dispersal system is connected to a bumper of the vehicle for dispersing front and/or rear vehicle impacts. In another embodiment, the impact dispersal system is connected to a seat back for dispersing the impact energy transferred to the seat back, which is allowed limited motion forward and backward due to the impact. In still another embodiment, the impact dispersal system is adapted to be used in a vehicle such as a carrier that is subject to being dropped, for example a carrier ejected from an airplane and attached to a parachute. In this embodiment the impact dispersal system is connected to feet or footers upon which the vehicle, or carrier, lands.

In one embodiment, a fluid chamber of the hydraulic cylinder is connected to a catch tank via a restriction orifice for controlling the bleed rate. The catch tank is connected to the cylinder through a pressure relief valve and an adjustable orifice. In another embodiment, the device includes a pressurized supply tank connected to the cylinder through a check valve. The pressurized tank is valved to the hydraulic cylinder to fill the fluid chamber of the cylinder. The connecting valve, in one embodiment, is actuated by operation of the vehicle braking system or other signal to cause the piston rod of the hydraulic cylinder to extend. In another embodiment, the connecting valve is actuated by a signal generated after an impact, thereby refilling the fluid chamber of the hydraulic cylinder. This embodiment is adapted for absorbing multiple impacts with the supply tank refilling the cylinder after each impact.

In another embodiment, the impact dispersal system includes a plurality of pressure relief valves, each having a different setpoint and an adjustable orifice. This embodiment is adapted for dispersing impacts at different force levels.

In still another embodiment, the impact dispersal system includes a double-acting hydraulic cylinder and a plurality of pressure relief valves and corresponding flow restrictors. The pressure relief valves are connected such that the fluid from one fluid chamber in the hydraulic cylinder is in fluid communication with the other fluid chamber through the plurality of valves and flow restrictors.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for dispersing impacts is disclosed. The impact dispersal system is generally shown as 100 in the figures. The impact dispersal system 100 disperses the energy from an impact after the pressure in the system 100 reaches a selected pressure setting. The rate of flow is controlled by, in various embodiments, adjustable or fixed orifices. The impact dispersal system 100 works with no recoil. As used herein, the term "vehicle" is used in its broad, common meaning of a means of carrying or transporting something. For example, an automobile is a motor vehicle, which is one type of a vehicle. A trailer and a wagon are other types of vehicles. Crates, carriages, containers and pallets are also vehicles.

Figure 1:
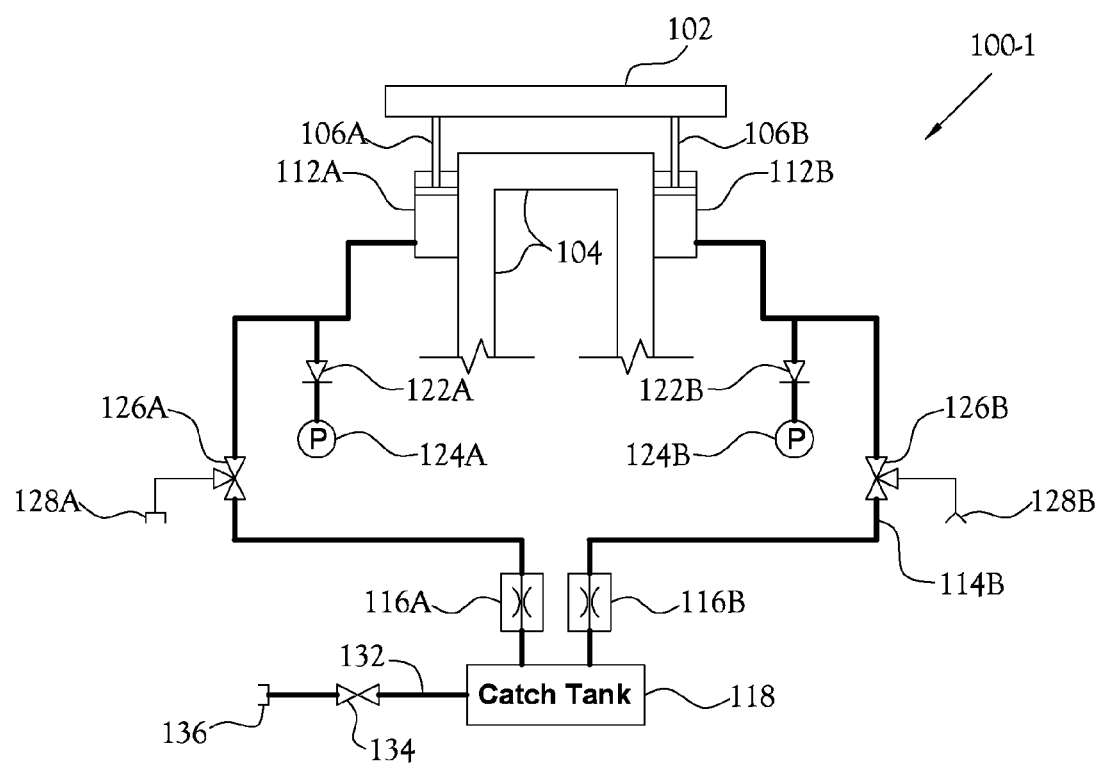
FIG. 1 is a schematic diagram of one embodiment of an impact dispersal system attached to a vehicle bumper.

FIG. 1 illustrates a schematic diagram of one embodiment of an impact dispersal system 100-1 attached to a vehicle bumper 102. In the illustrated embodiment, the impact dispersal system 100 is disposed between a vehicle chassis, or frame, 104 and a vehicle bumper 102. An impact to the bumper 102 parallel to the longitudinal axis of the piston rods 106 connecting the bumper 102 to the hydraulic cylinders 112 allows the system 100 to disperse the effects of the impact by slowly decelerating the vehicle. Those skilled in the art will recognize that the impact dispersal system 100-1 can be positioned at either the front or rear of the vehicle, or at both locations, without departing from the spirit and scope of the present invention.

The impact dispersal system 100-1 includes a pair of hydraulic cylinders 112A, 112B connected to a pair of three-way fill valves 126A, 126B by way of tubing 114A, 114B, a pair of flow restrictors, or orifices, 116A, 116B, and a catch tank, or reservoir, 118. Connected to each three-way fill valves 126A, 126B is a connection 128A, 128B for filling the system. In one embodiment, the connection 128 allows for fluid 204 to be pulled from the catch tank 118 into the cylinders 112 to push the cylinders 112 so that the piston rod 106 is in the extended position. In one embodiment, the fluid 204 is an incompressible liquid, such as a hydraulic fluid. In another embodiment, the fluid is a compressed gas, such as air. In one embodiment of the impact dispersal system 100, the system 100 discharges the fluid 204 to the atmosphere and not into the catch tank 118. In such an embodiment, the fluid 204 is a bio-degradable or otherwise benign hydraulic fluid. For a single-use system, the fluid 204 does not need to be retained and environmental friendly fluids will not contaminate the ground.

In one embodiment, the flow restrictors, or orifices, 116 are adjustable orifices that allow varying the flow rate from the cylinders 112. In another embodiment, the flow restrictors, or orifices, 116 are orifices that are fixed, that is, the restrictors 116 are not adjustable. In this embodiment, the flow restrictors, or orifices, 116 are selected for the application.

For testing purposes, connected to each piece of tubing 114 is a check valve 122 and pressure gauge 124. The pressure gage 124 indicates the maximum pressure of the system. The catch tank 118 includes a pipe 132 connected to a valve 134 and a connector 136. Opening the valve 134 after a supply of hydraulic fluid is connected to the connector 136 allows the catch tank 118 to be filled. Likewise, the catch tank 118 can be drained by opening the valve 134 with the connector 136 draining into an appropriate receptacle.

In operation, the cylinders 112 are filled with hydraulic fluid 204, thereby extending the piston rod 106 and the bumper 102. Upon impact, the bumper 102 forces the piston rod 106 into the cylinder 112, thereby pressurizing the hydraulic fluid 204 and forcing the fluid 204 out of the cylinder 112 through the flow restrictor 116.

Figure 2:
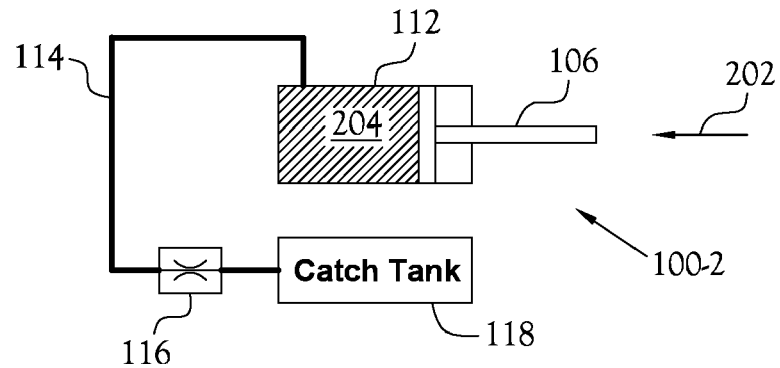
FIG. 2 is a schematic diagram of one embodiment of an impact dispersal system.

FIG. 2 illustrates a simplified schematic diagram of one embodiment of an impact dispersal system 100-2. In the illustrated embodiment, the impact dispersal system 100-2 includes a hydraulic cylinder 112 with a piston rod 106. The hydraulic cylinder is connected, by way of tubing 114, to a restrictor, or orifice, 116 that drains into a catch tank, or catch tank, 118. A force 202 applied to the piston rod 106 causes the hydraulic fluid 204 to be forced out of the cylinder 112. The restrictor 116 limits the flow rate of the hydraulic fluid 204 out of the cylinder 112, thereby controlling the dispersal rate. A larger sized orifice in the restrictor 116 allows the fluid 204 to exit from the cylinder 112 at a faster rate, whereas a smaller size orifice in the restrictor 116 allows the fluid 204 to exit from the cylinder 112 at a slower rate.

Figure 3:
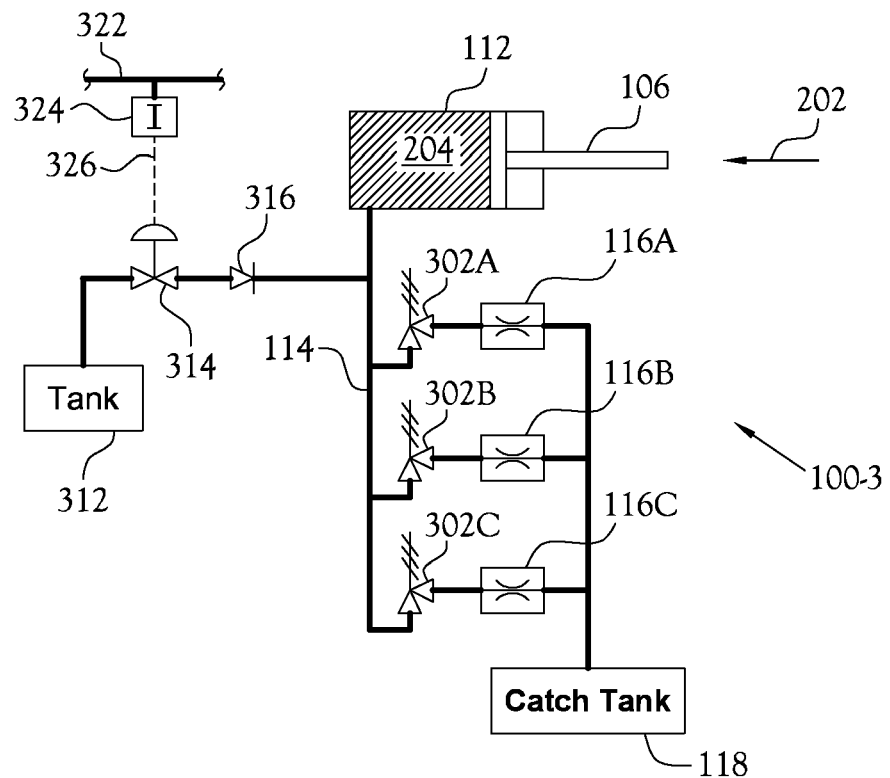
FIG. 3 is a schematic diagram of one embodiment of an impact dispersal system with three levels of dispersal and an automatic extension feature.

The catch tank 118 illustrated in FIGS. 2 and 3 is at atmospheric pressure. The tank 118 is vented such that the flow of fluid 204 into the catch tank 118 is not restricted by any pressure buildup in the tank 118.

FIG. 3 illustrates a schematic diagram of one embodiment of an impact dispersal system 100-3 with three levels of dispersal and with an automatic extension feature. In the illustrated embodiment, the impact dispersal system 100-2 includes a hydraulic cylinder 112 with a piston rod 106. The hydraulic cylinder is connected, by way of tubing 114, to a bank of relief valves 302A, 302B, 302C that are each connected to a restrictor 116A, 116B, 116C, respectively. Each of the relief valves 302 has an increasingly higher setpoint. The restrictors 116 drain into the catch tank 118. The illustrated impact dispersal system 100-3 allows for dispersing impacts of varying force. A greater impact results in a higher pressure in the cylinder 112, which causes flow through more of the relief valves 302.

When a force 202 is applied to the piston rod 106, the pressure of the hydraulic fluid 204 in the cylinder 112 increases until the fluid pressure reaches the setpoint of the first relief valve 302A, which opens, allowing the fluid 204 to pass through the restrictor 116A into the catch tank 118. If the force 202 applied to the piston rod 106 is greater than can be dispersed through the first relief valve 302A, then the fluid pressure will increase further. If the fluid pressure reaches the setpoint of the second relief valve 302B, the second relief valve 302B will open, allowing the fluid 204 to pass through the restrictor 116B into the catch tank 118. If the force 202 applied to the piston rod 106 is greater than can be dispersed through the first and second relief valves 302A, 302B, then the fluid pressure will increase further. If the fluid pressure reaches the setpoint of the third relief valve 302C, the third relief valve 302B will open, allowing the fluid 204 to pass through the restrictor 116C into the catch tank 118. After the fluid pressure decreases below the setpoint of each relief valve 302, the relief valve 302 closes. In this manner, the dispersal rate varies depending upon the amount of force 202 applied to the piston rod 106.

Also illustrated in FIG. 3 is an automatic extension feature that extends the piston rod 106 when the vehicle operator applies the vehicle brake with excessive force, as would be the case when the vehicle operator recognized that a collision is imminent. When the vehicle operator applies the vehicle brakes, the pressure in the brake line 322 increases. The pressure in the brake line 322 increases as the operator applies greater braking force. Connected to the brake line 322 is an isolator 324 that has an impulse line 326 to a pilot operated valve 314 that opens when the impulse pressure increases above a setpoint. A pressurized tank 312 feeds the pilot operated valve 314, which has its outlet passing through a check valve 316 that feeds into the tubing 114 connected to the hydraulic cylinder 112. The pressurized tank 312 is a vessel that partially contains hydraulic fluid 204 with the volume of the tank not containing the fluid 204 filled with a pressurized gas. The gas pressurizes the contents of the tank 312, including the fluid 204, and when the valve 314 is opened, the fluid 204 is forced out of the tank 312 by the expanding gas.

The check valve 316 prevents any fluid 204 from the cylinder 112 from flowing back to the tank 312 as a result of an impact dispersed by the system 100-3. When the vehicle operator uses excessive braking force, the pressure in the brake line 322 is transmitted to the impulse line 326 through the isolator 324. The pressure in the impulse line 326, if it is greater than the setpoint of the pilot operated valve 314 causes the pilot operate valve 314 to open, thereby allowing the pressurized hydraulic fluid in the tank 312 to flow into the cylinder 112 and forcing the piston rod 106 into the extended position. In another embodiment, the valve 314 is a pressure operated valve that is actuated when the pressure in the brake line 322 exceeds a setpoint value.

In this embodiment, the bumper 102, or other impact receiving member, is carried in a retracted position during normal operation. However, when an impact is imminent, as indicated by extreme pressure on the vehicle brakes, the bumper 102, or other impact receiving member, is extended so as to protrude from the vehicle. This allows the full length of travel of the piston rod 106 to be available for impact dispersal. In another embodiment, the valve 314 is opened by some other means, such as a mechanical trip or an electric solenoid, thereby extending the piston rod 106 and readying the impact dispersal system 100-3 for use. Such an embodiment is useful for the application illustrated in FIG. 6.

In various embodiments, the bumper 102 is carried in the fully extended position, partially extended position, or the fully retracted position. With the bumper 102 in the fully extended position, such as the embodiment illustrated in FIG. 1, the impact dispersal system 100-1 is always available for use. With the bumper 102 carried in the partially extended or fully retracted positions, some action is necessary to fully extend the bumper 102 before the bumper 102 is required to disperse an impact. As illustrated in FIG. 3, on such embodiment for extending the bumper 102 immediately before it is required to be available is by using the braking of the vehicle to extend the bumper 102.

In another embodiment, the valve 314 connecting the pressurized tank 312 to the hydraulic cylinder 112 is actuated by another sensor or switch. For example, in one embodiment, the valve 314 is actuated immediately after an impact is dispersed by the system 100-3, thereby setting up the system 100-3 to be ready for another impact. In one such embodiment, the connection valve 314 is actuated by a limit switch controlled by the position of the piston rod 106.

The impact dispersal system 100-1 illustrated in FIG. 1, in other embodiments, incorporates one or more of the features illustrated in FIG. 3. For example, the discharge line 114 of each hydraulic cylinder 112A, 112B of the system 100-1 includes a relief valve 302 in series with a flow orifice 116. In another embodiment, the system 100-1 illustrated in FIG. 1 includes a pressurized tank 312 and connecting valve 314.

Figure 4:
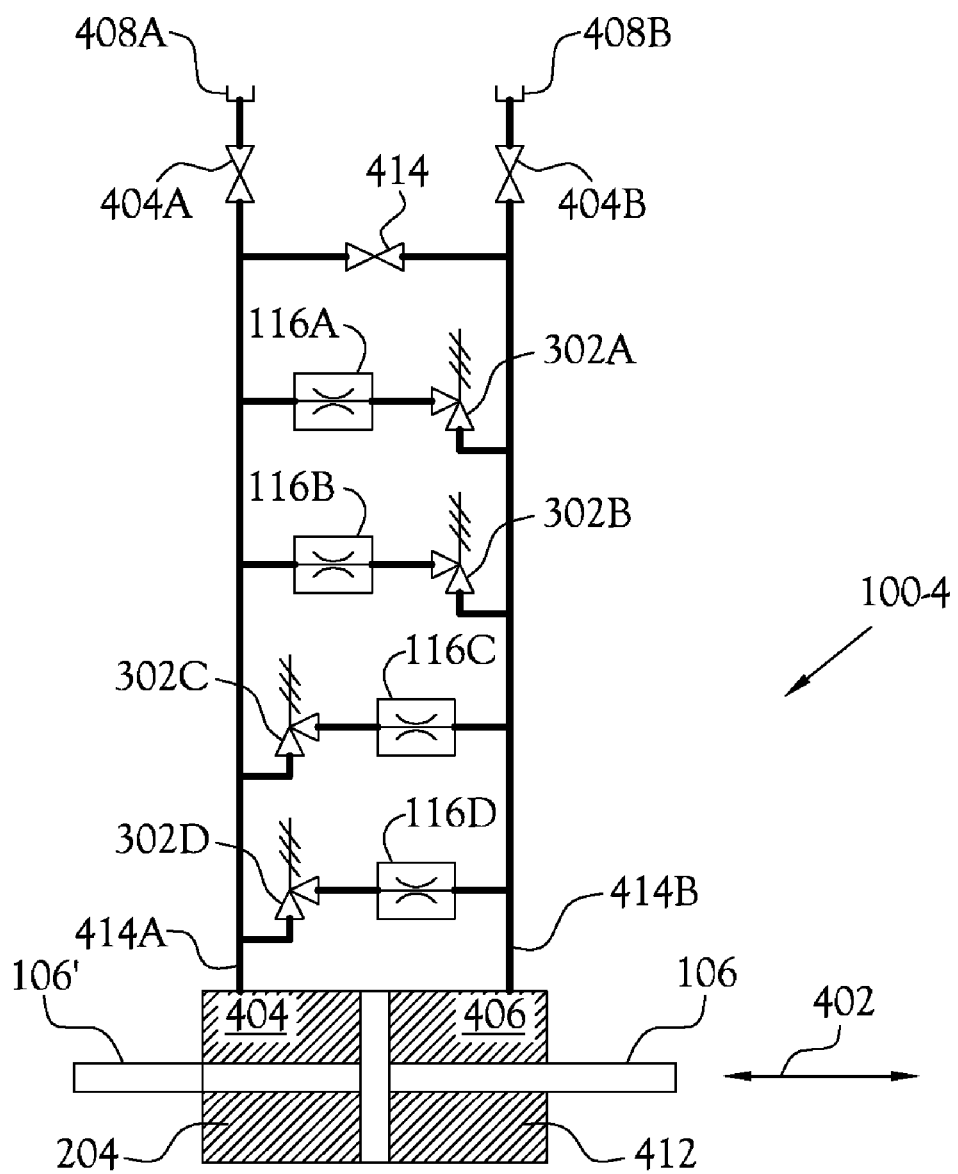
FIG. 4 is a schematic diagram of one embodiment of a two-way impact dispersal system with two levels of dispersal.

FIG. 4 illustrates a schematic diagram of one embodiment of a two-way impact dispersal system 100-4 with two levels of dispersal. A double-acting hydraulic cylinder 412 has a front piston rod 106 and a rear piston rod 106' with a pair of hydraulic lines 414A, 414B, each connected to one of the back chamber 404 and the front chamber 406. Connecting the two lines 414A, 414B is a normally closed cross-connect valve 414. The lines 414A, 414B terminate in normally closed valves 404A, 404B that each communicate with a connector 408A, 408B. The arrangement of these three valves 404A, 404B, 414 and connectors 408 allow the hydraulic cylinder 412 to be positioned and/or charged. The double acting hydraulic cylinder 412 with the two piston rods 106, 106' has a constant fluid volume for the two chambers 404, 406. That is, the volume of the back chamber 404 and the volume of the forward chamber 406, when added together, is constant regardless of the position of the piston rods 106, 106'. With the constant volume of the two chambers 404, 406, the two-way impact dispersal system 100-4 is a closed system. Those skilled in the art will recognize that the number of relief valves 302 and flow restrictors 116 can vary without departing from the spirit and scope of the present invention.

The double acting hydraulic cylinder 412 operates in two modes: retracting and extending. A force 402 acting on the piston rod 106 moves the rod 106 in one of two directions. With the direction of the force 402 toward the cylinder 412, the rod 106 retracts, thereby increasing the pressure of the fluid 204, which flows from the contracting back chamber 404, through the tubing 414A to the relief valves 302C, 302D, which are configured similarly to those illustrated in FIG. 3. The relief valves 302C, 302D have different setpoints whereby the second valve 302D, 302C opens only when the force 402 is so great that the pressure cannot be relieved by the first valve 302C, 302D. The discharge from each relief valve 302C, 302D flows through a restrictor 116C, 116D, respectively, and into the expanding, front chamber 406.

With the direction of the force 402 in the opposite direction, away from the cylinder 412, the rod 106 extends, thereby increasing the pressure of the fluid 204 in the forward chamber 406. The fluid 204 flows from the contracting forward chamber 406, through the tubing 414B to the relief valves 302A, 302B, which are configured similarly to those illustrated in FIG. 3. The relief valves 302A, 302B have different setpoints whereby the second valve 302B, 302A opens only when the force 402 is so great that the pressure cannot be relieved by the first valve 302A, 302B. The discharge from each relief valve 302A, 302B flows through a restrictor 116C, 116D, respectively, and into the expanding, back chamber 404.

Figure 5:
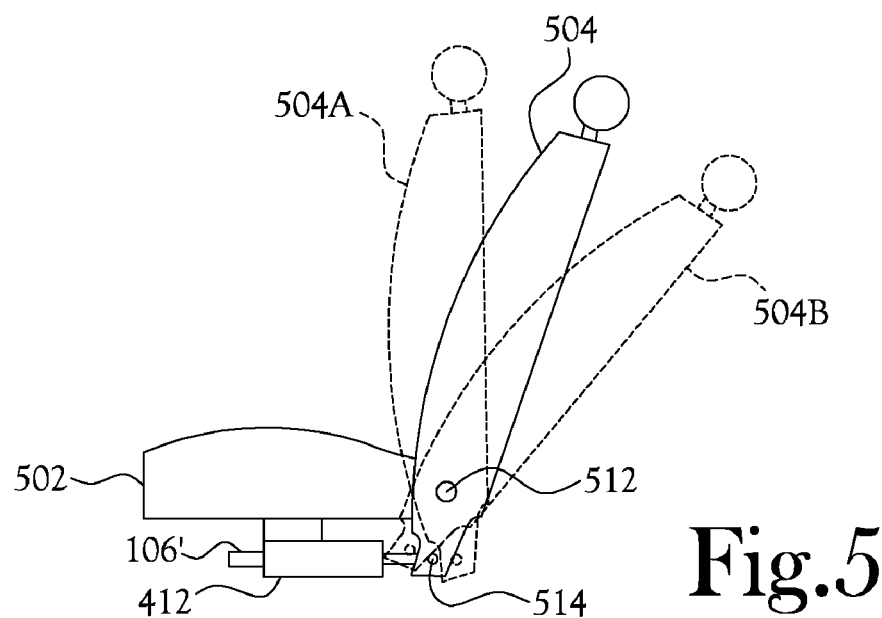
FIG. 5 is a pictorial view of one embodiment of an application of a two-way impact dispersal system.

With the illustrated arrangement of the two-way impact dispersal system 100-4, the system 100-4 provides impact dispersal for impacts that occur in opposite directions. For example, FIG. 5 illustrates a pictorial view of one embodiment of an application of a two-way impact dispersal system 100-4. A vehicle seat 502 has a seat back 504 that, in normal operation, is in a position adjusted for the comfort of the seat occupant. The seat back 504 will tend to move to a forward position 504A or a backward position 504B as result of any impact the vehicle in which the seat 502 is installed undergoes, whether the impact be to the rear or the front of the vehicle. The seat back 504 pivots about a pivoting axis 512 when the seat back 504 is adjusted normally or the seat back 504 moves as a result of an impact. In the illustrated embodiment, a double acting hydraulic cylinder 412 is fixed to the seat bottom or other member that is normally held in a fixed position relative to the seat back 504 during an impact. The piston rod 106 of the cylinder 412 is attached to a point 514 on the seat back 504 that moves as the seat back 504 moves between its forward and backward positions 504A, 504B.

The seat back 504 is normally constrained to move between a forward and backward position 504A, 504B. During an impact sustained by the vehicle, the two-way impact dispersal system 100-4 is able to disperse impact forces applied in part by the momentum of the occupant of the seat 502. With a seat restraining system secured to the seat back 504 such that the occupant is restrained relative to the seat 502, the momentum of the occupant and the seat back 504 is dispersed by the two-way impact dispersal system 100-4, which is connected to the seat back 504. In one embodiment, a portion of the shoulder harness of the seat restraining system is secured to the seat back 504. The two-way impact dispersal system 100-4 disperses a portion of an impact to the vehicle from either the front or the rear. Such an impact causes the seat back 504, and the occupant, to move rearward or forward, respectively, with the system 100-4 keeping the head and upper body adjacent the headrest and seat back 204, thereby lessening the risk of head and neck injuries resulting from body recoil.

In one embodiment, stops are provided to limit the movement of the seat back 504 between the forward position 504A and the backward position 504B. The stops are integral with the rod 106 such that the rod 106 is constrained to move only between the stops, thereby limiting the range of motion of the seat back 504. In another embodiment, the stops are integrated with the seat 502 and seat back 504 assembly such that the seat back 504 is constrained to move only between the stops.

Figure 6:
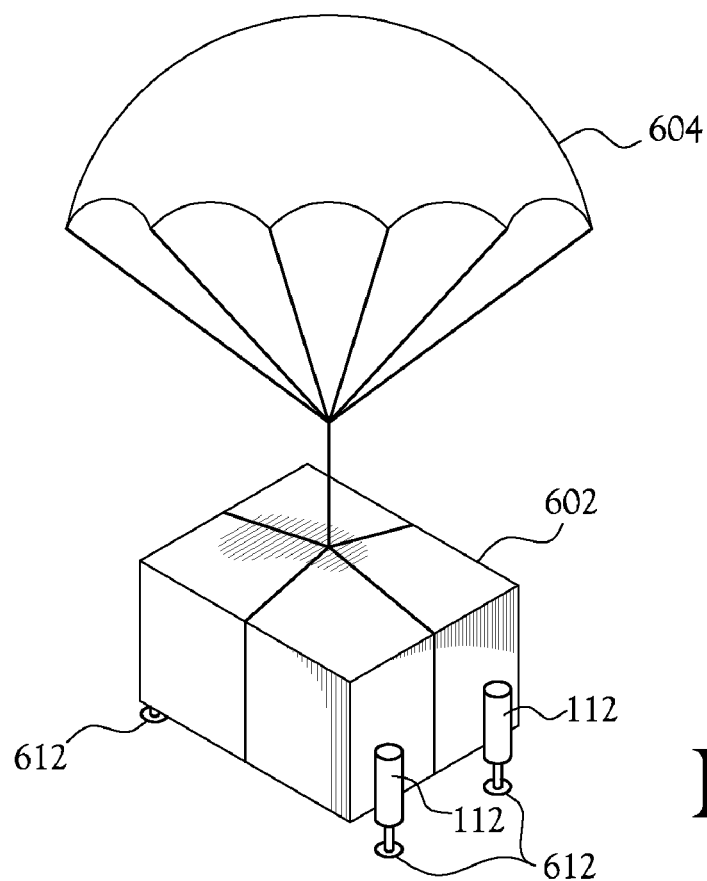
FIG. 6 is a pictorial view of one embodiment of an application of an impact dispersal system.

FIG. 6 illustrates a pictorial view of one embodiment of an application of an impact dispersal system 100. In the illustrated embodiment, a vehicle, such as a carrier or crate, 602 is attached to a parachute 604. The carrier 602 includes a hydraulic cylinder 112 near each corner. The piston rod 106 of each cylinder 112 has a foot 612 attached. When the object 602 lands, the feet 602 contact the ground and the cause the attached piston rods 106 to retract into the cylinders 112. Each cylinder 112 and foot 612 is independent, thereby facilitating landing the object 602 on uneven surfaces or rough terrain.

In various embodiments, the object 602 is a vehicle, such as a motor vehicle or a crate, dropped from an airplane. In the embodiment in which the carrier 602 is a motor vehicle, the hydraulic cylinders 112 are attached to the motor vehicle frame or structure. In the embodiment in which the carrier 602 is a crate, the cylinders 112 are attached to the sides of the crate 602, as illustrated. In another embodiment, the cylinders 112 are attached to a skid or pallet with the feet 612 extending below the skid or pallet bottom.

In one embodiment, the piston rods 106 and feet 612 are extended just after the object 602 is dropped from the aircraft. One embodiment includes a rope or other actuator for opening the valve 314, which allows the fluid 204 stored in a pressurized tank to position the piston rods 106 in the cylinders 112 such that the system 100-3 is ready for deployment. After the vehicle 602 is on the ground, the piston rods 106 are retracted, thereby lifting the feet 612 off the ground and allowing the vehicle 602 to be moved. In one embodiment of the impact dispersal system 100, the system 100 discharges the fluid 204 to the atmosphere and not into a catch tank 118. In this embodiment, the fluid 204 is a biodegradable or otherwise benign hydraulic fluid. Because the illustrated embodiment depicts a single-use system, the fluid 204 does not need to be retained and environmental friendly fluids will not contaminate the ground.

In another embodiment, the impact dispersal system 100 illustrated in FIG. 6 includes a fixed orifice or restrictor 116 and a fixed setpoint pressure relief valve 302. The size of the restrictor 116 and the setpoint of the valve 302 are determined based on the characteristics of the object 602, such as weight, rate of descent, and weather conditions.

Figure 7:
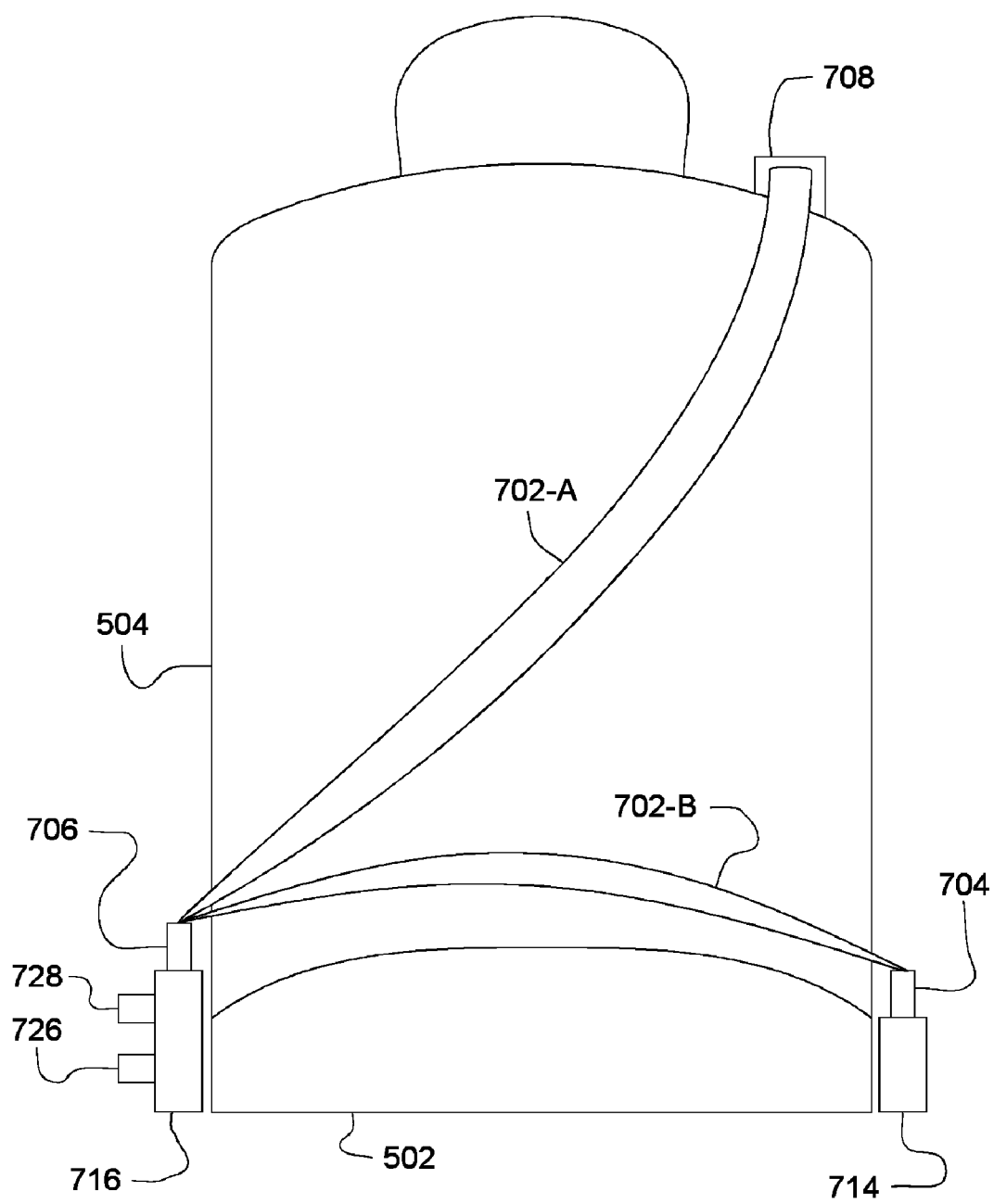
FIG. 7 is a front view of a seat employing the two-way impact dispersal system shown in FIG. 5.

FIG. 7 illustrates a front view of a vehicle seat 502 and seat back 504 of the embodiment of the application employing the two-way impact dispersal system 100-4 shown in FIG. 5. As described above, the seat back 504 moves between a forward position 504A and a backward position 504B. It is known to have the shoulder harness portion of a seat belt of a vehicle attached to the vehicle, such as on the support column adjacent the door. With the seat harness attached to a fixed point and the seat back 504 moving between two positions 504A, 504B, the passenger occupying the seat 502 will experience a too tight seat harness and a too loose seat harness, respectively. The embodiment illustrated in FIG. 7 overcomes the relative movement between the seat back 504 and the seat harness 702A.

Adjacent one side of the seat 502 is a seat belt mount 714 with bracket 704 to which one end of the seat belt 702 is attached. A portion of the seat belt 702B crosses over the seat 502 and is adapted to lie adjacent the lap of the passenger occupying the seat 502. The seat belt 702 passes through a seat belt latch tongue 706, which clips into the seat belt latching mechanism 716. The seat belt latching mechanism 716 includes a seat belt release button 726, which in the illustrated embodiment is shown on the side of the latching mechanism 716. Those skilled in the art will recognize that the release button 726 can be located at other positions on the latching mechanism 716 without departing from the spirit and scope of the present invention. The upper end of the shoulder portion 702A of the seat belt 702 connects to the seat belt retractor 708. The seat belt retractor assembly 708 coils the excess length of the seat belt 702 to allow the seat belt 702 to fit snugly against the passenger occupying the seat 502. The seat belt retractor assembly 708 also includes a locking mechanism that prevents the seat belt 702 from being released from the retractor assembly 708 when the seat belt 702 is needed to restrain the passenger occupying the seat 502 during a collision or impact to the vehicle.

In the illustrated embodiment, the seat belt retractor 708 is attached to the seat back 504 with structural support to withstand the forces encountered by the seat harness system during an accident. Because the seat belt retractor 708 is in a fixed position relative to the seat back 504, the shoulder portion 702A of the seat belt 702 maintains its pre-determined position with respect to the passenger occupying the seat 502 during an accident or when the seat harness system is otherwise required.

Figure 8:
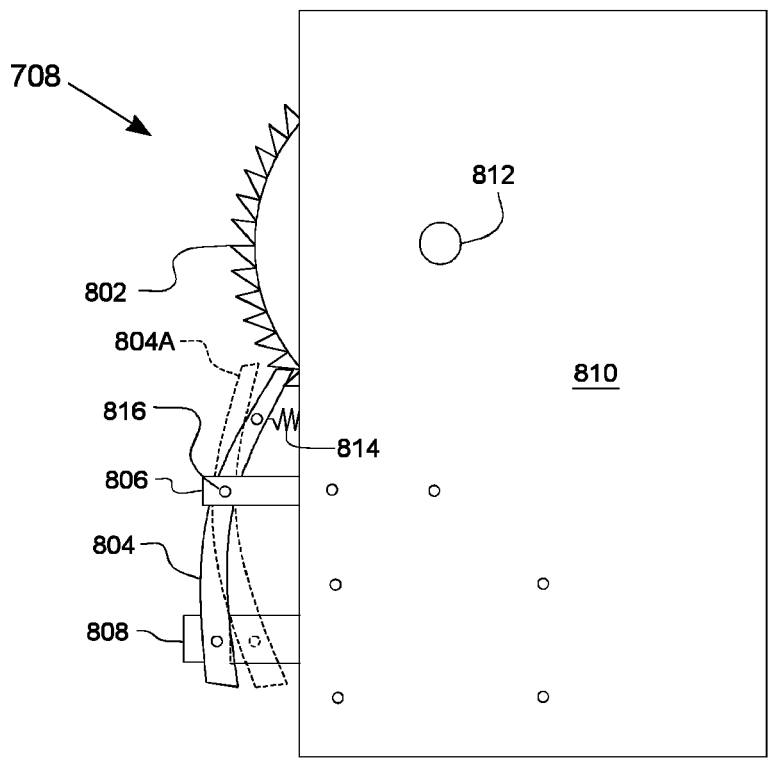
FIG. 8 is a side view of one embodiment of a seat belt harness retractor and lock assembly.
Figure 9:
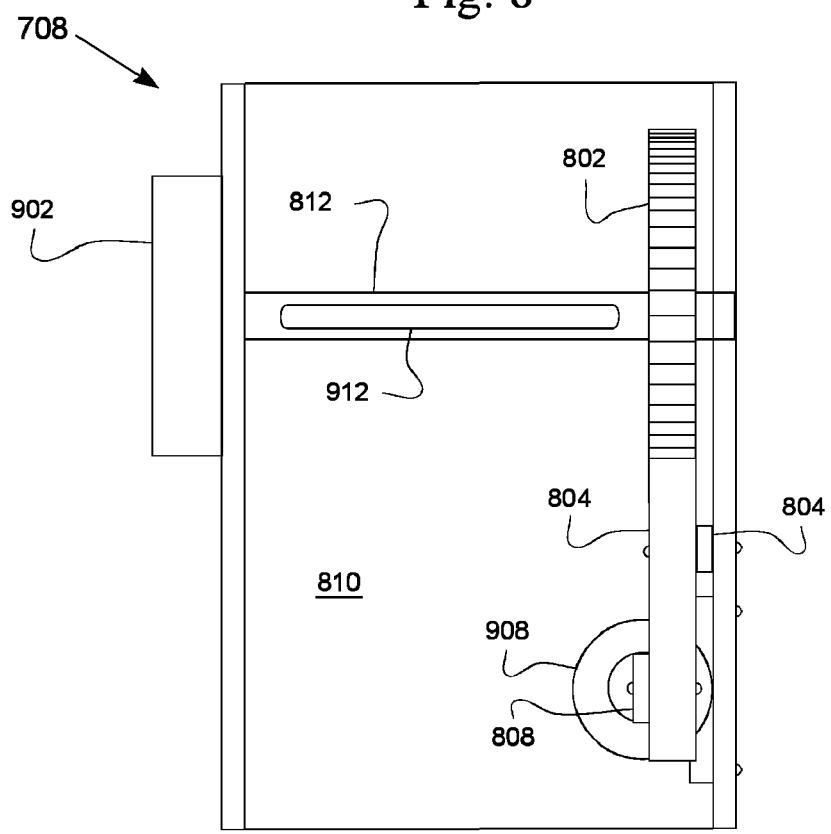
FIG. 9 is a front view of the seat belt harness retractor assembly shown in FIG. 7.

FIG. 8 illustrates a side view of one embodiment of a seat belt harness retractor assembly 708. FIG. 9 illustrates a front view of the seat belt harness retractor assembly 708shown in FIG. 7. The retractor assembly 708 includes a rotating shaft 812 about which the excess length of the seat belt 702 winds for storage. The shaft 812, in the illustrated embodiment, has a slot 912 that receives the end of the belt 702. The shaft 812 is connected to a coil spring 902 that provides the winding force.

As an alternative to the automatic locking mechanisms used in the seat belt retractors 708, the illustrated embodiment includes a pawl 804 that selectively engages a toothed wheel 802 to lock the wheel 802 and the shaft 812 in a fixed position. The pawl 804 pivots about a pin 816 in a support member 806 attached to the retractor housing 810. One end of the pawl 804 is attached to an actuator shaft 808 that is selectively extended and retracted from an actuator 908, thereby causing the opposite end of the pawl 804 to engage and disengage from the toothed wheel 802. The disengaged position of the pawl 804A is illustrated in FIG. 8 with broken lines. Near the end of the pawl 804 adjacent the toothed wheel 804 is a spring 814 held in tension. The spring 814 pulls the pawl 804 toward the wheel 802 and forces the pawl 804 to engage the wheel 802. Those skilled in the art will recognize that the spring 814 can be of other types, such as a torsion spring, without departing from the spirit and scope of the present invention.

In one embodiment, the pawl 804 moves between the engaged and disengaged positions solely through the movement of the actuator shaft 808. In another embodiment, a spring 814 attached to the housing 810 acts on the pawl 804 to force the pawl 804 into the engaged position. Such a spring 814, in one embodiment, is a torsion spring that forces the pawl 804 into the engaged position. In the illustrated embodiment, a coil spring 814 is attached to the pawl 804 near the toothed wheel 802, thereby forcing the pawl 804 into the engaged position. With the pawl 804 forced into the engaged position, actuation of the actuator shaft 808 pulls the opposite end of the pawl 804 down, thereby unlocking the toothed wheel 802 and allowing adjustment of the seat belt 702.

In one embodiment, a locking button 728 is mounted on the seat belt retractor assembly 708. The locking button 728 operates the actuator 908 to move the pawl 804 to the disengaged position 804A. In one embodiment, the locking button 728 is an electrical switch that is connected to the actuator 908, which is a solenoid. In another embodiment, the locking button 728 is connected to a cable that causes the actuator shaft 808 to move. In either embodiment, the button 728 allows the passenger in the seat 502 to have freedom of movement unrestrained by the belt 702 with the push of a pushbutton 728.

Figure 10:
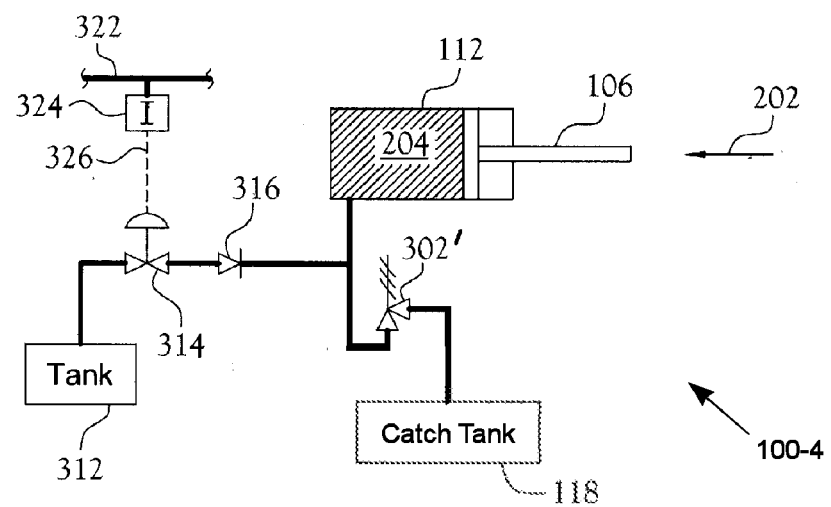
FIG. 10 is a schematic diagram of another embodiment of an impact dispersal system with a multi-level relief valve.

FIG. 10 illustrates a schematic diagram of another embodiment of an impact dispersal system 100-4 with a multi-level relief valve 302'. The illustrated embodiment of the system 100-4 is similar to the embodiment illustrated in FIG. 3 except the three relief valves 302A, 302B, 302C, each with a single setpoint, and the three associated flow restrictors 116A, 116B, 116C are replaced with a single relief valve 302' that has a first setpoint where the valve 302' first opens and then has a variable flow rate until the valve is submitted to a pressure where the valve is fully open. In the illustrated embodiment, as the piston rod 106 moves due to an impact 202, the pressure of the fluid 204 increases. As the pressure increases to the first setpoint, the relief valve 302' opens allowing fluid 204 to be released to the catch tank 118 at a pre-determined flow rate. If the pressure in the cylinder 112 continues to increase to the second setpoint of the valve 302', the relief valve 302' allows a greater flow rate of fluid 204 to be released from the cylinder 112 to the catch tank 118.

Figure 11:
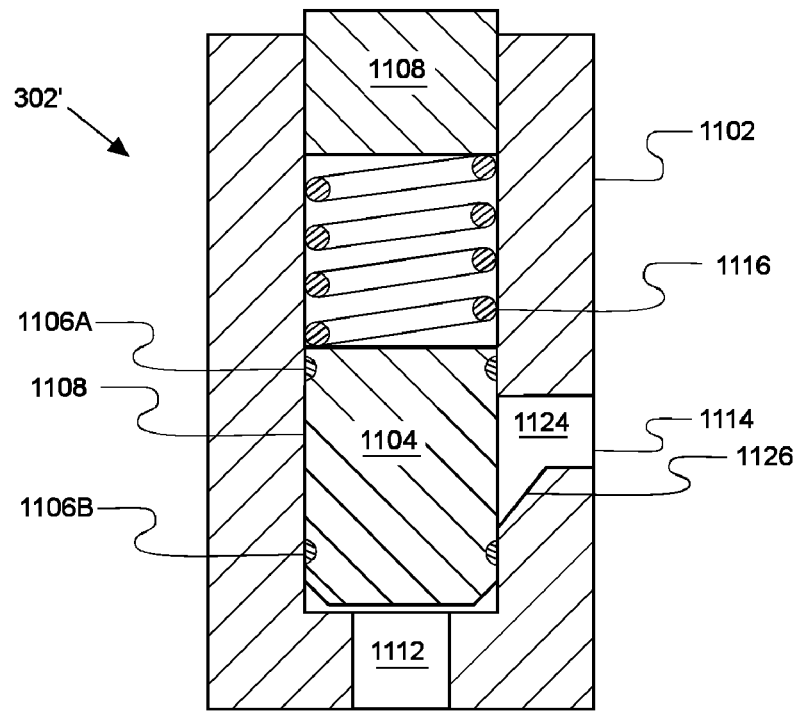
FIG. 11 is a cross-sectional view of one embodiment of a relief valve with a variable rate of relief.

FIG. 11 illustrates a cross-sectional view of one embodiment of a relief valve 302' with a variable setpoint. The illustrated relief valve 302' is a direct acting piston valve. The piston 1104 moves within a bore 1108 of the valve body 1102 with the position of the piston 1104 related to the pressure of a fluid at the inlet port 1112. A lower o-ring 1106B is positioned between the piston 1104 and the surface of the bore 1108 in the valve body 1102, and an upper o-ring 1106A is positioned on the piston 1104 proximate the spring 1116. A spring 1116 between the piston 1104 and a plug 1108 in the valve body 1102 counteracts the force of the fluid applied to the lower face of the piston 1104. The plug 1108, in one embodiment, has a threaded engagement with the valve body 1102 in which the plug 1108 position relative to the bottom of the bore 1108 in the valve body 1102 is adjustable, thereby changing the force applied to the piston 1104 by the spring 1116. In another embodiment, the plug 1108 is fixed in position in the valve body 1102 such that the spring 1116 applies a preselected force to the piston 1104.

The outlet port 1114 of the valve 302' has a central bore 1124 with a slot 1126 positioned towards the inlet port 1112. As the pressure of the fluid increases, causing the piston 1104 to move up, when the pressure reaches the first setpoint the slot 1126 is exposed to the fluid from the inlet port 1112, thereby allowing the fluid to pass through the valve 302' at a rate based on the cross-sectional area of the slot 1126 exposed by the piston 104. If the pressure continues to increase, the piston 1104 continues to move up, thereby exposing more of the area of the slot 1126 until the piston exposes the main outlet bore 1124 when the second setpoint is reached. In the illustrated embodiment, the slot 1126 is slanted such that, as the piston 1104 moves upward, a greater volume of fluid flows into the slot 1126. Those skilled in the art will recognize that the angle and shape of the slot 1126 can vary without departing from the scope and spirit of the present invention. As the main outlet bore 1124 is exposed by the piston 1104 moving up, the rate of flow from the inlet port 1112 to the outlet port 1114 increases. In one embodiment, the slot 1126 is a channel in the valve body 1102.

In the illustrated embodiment, the valve 302' has a first setpoint associated with initially exposing the slot 1126, a second setpoint associated with exposing the main outlet bore 1124, and a high setpoint associated with having the maximum are of the main outlet bore 1124 exposed. The outlet port 1114 is a staged outlet port because of the slot 1126 and the main outlet bore 1124 allow the flow rate through the outlet port 1114 to vary by stages. That is, the first stage of the illustrated embodiment begins when the piston 1104 exposes the slot 1126, thereby allowing fluid to flow through the valve in relation to the amount of the slot 1126 exposed by the piston 1104 movement. The second stage begins when the piston 1104 exposes the main bore 1124, thereby allowing a greater flow rate through the valve 302'.

In various embodiments, the shape, size, and location of the slot 1126 is configured to obtain the number of setpoints desired and the flow rate at and between each of those setpoints. The slot 1126 and main outlet bore 1124 act as a variable flow restrictor, with the amount of flow restriction being a function of the exposed area and the position of the piston 1104 based on the fluid pressure. In another embodiment, the two sets of relief valves 302 and flow restrictors 116 illustrated in FIG. 4 are replaced with a pair of multiple setpoint relief valves 302', with each valve 302' discharging to one of the chambers 404, 404.

The impact dispersal system 100 includes various functions. The function of receiving an impact is implemented, in one embodiment, by the bumper 102 connected to the hydraulic cylinder 112 as illustrated in FIG. 1. In another embodiment, the function of receiving an impact is implemented by the seat back 504 that is connected to the hydraulic cylinder 412 as illustrated in FIG. 5. In still another embodiment, the function of receiving an impact is implemented by the feet 602 upon which the vehicle, or object, 602 lands after being dropped, as illustrated in FIG. 6.

The function of retracting a seat belt 702 for securing a passenger to the seat back 504 is implemented, in one embodiment, by the seat belt harness retractor assembly 708 as illustrated in FIGS. 7, 8, and 9. In one embodiment, the seat belt harness retractor assembly 708 includes a conventional seat belt retractor with an automatic locking device. In another embodiment, the seat belt harness retractor assembly 708 includes a manual locking device including a pawl 804 engaging a toothed wheel 802 with the pawl 804 responding to an actuator 908.

From the foregoing description, it will be recognized by those skilled in the art that an impact dispersal system 100 has been provided. This system 100, in its various embodiments, includes a cylinder 112 with a piston rod 106 adapted to receive the forces from an impact. The cylinder 112 has a fluid 204 that is forced out of the cylinder 112 by the impact. In the various embodiments, the fluid 204 passes through at least one flow restrictor 116 and at least one pressure relief valve 302.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for impact dispersal of a force applied to a vehicle, said apparatus comprising:
   a hydraulic cylinder having a piston rod and a first fluid chamber filled with a fluid, said hydraulic cylinder connected to a first structural member of a vehicle and said piston rod connected to a second structural member of said vehicle;
   a first relief valve in fluid communication with said first fluid chamber, said first relief valve having a first setpoint;
   a first flow restrictor in fluid communication with said first relief valve, said first relief valve and said first flow restrictor being in series connection;
   a second relief valve in fluid communication with said first fluid chamber, said second relief valve having a second setpoint, said first setpoint being different than said second setpoint; and
   a second flow restrictor in fluid communication with said second relief valve, said second relief valve and said second flow restrictor being in series connection, said first relief valve and said first flow restrictor being parallel to said second relief valve and said second flow restrictor;
   whereby an impact force applied along a longitudinal axis of said piston rod pressurizes said fluid which escapes said first fluid chamber through said first and second relief valves and at a rate controlled by said first and second flow restrictors.

2. The apparatus of claim 1 wherein said first relief valve and said first flow restrictor direct said fluid from said first fluid chamber when said first relief valve actuates and said second relief valve and said second flow restrictor directs said fluid from said first fluid chamber when said second relief valve actuates.

3. The apparatus of claim 1 wherein said first relief valve, said first flow restrictor, said second relief valve, and said second flow restrictor are incorporated into a single valve assembly.

4. The apparatus of claim 3 wherein said single valve assembly includes a piston, a spring, and a staged outlet port, said staged outlet port allowing a rate of fluid flow to vary in relation to a pressure of said fluid.

5. The apparatus of claim 3 wherein said single valve assembly includes a piston, a spring, and an outlet port, said outlet port having a main outlet channel and a slot, said slot being exposed to said fluid from an inlet port before said main outlet channel is exposed to said fluid as a pressure of said fluid increases.

6. The apparatus of claim 1 wherein a bumper of said vehicle is attached to one of said first structural member and said second structural member.

7. The apparatus of claim 1 wherein a seat back of said vehicle is attached to one of said first structural member and said second structural member, said seat back pivotally constrained to move between a forward position and a backward position by said piston rod during said impact.

8. The apparatus of claim 1 wherein said hydraulic cylinder further includes a second fluid chamber filled with said fluid, said hydraulic cylinder being a double-acting cylinder whereby movement of said piston rod acts on said first and second fluid chambers, said first relief valve and said first flow restrictor directing said fluid to said second fluid chamber when said first relief valve actuates, and said second relief valve and said second flow restrictor directing said fluid from said second fluid chamber when said second relief valve actuates.

9. The apparatus of claim 1 wherein said vehicle is a carrier subject to a dropping force, one of said first and second structural members being a footer upon which said carrier rests after being subject to said dropping force.

10. The apparatus of claim 1 further including means for receiving said impact.

11. The apparatus of claim 1 further including a pressurized tank containing said fluid, said pressurized tank in fluid communication with a connection valve that is in fluid communication with said first fluid chamber.

12. The apparatus of claim 1 further including a pressurized tank containing said fluid, said pressurized tank in fluid communication with a connection valve that is in fluid communication with said first fluid chamber, said connection valve actuated by a signal from a vehicle braking system.

13. An apparatus for impact dispersal of a force applied along one axis, said apparatus comprising:
- a hydraulic cylinder having a piston rod, said hydraulic cylinder being a double-acting hydraulic cylinder having a first fluid chamber and a second fluid chamber filled with a fluid, said hydraulic cylinder connected to a first structural member of a vehicle and said piston rod connected to a second structural member of said vehicle;
- a first relief valve in fluid communication with said first fluid chamber, said first relief valve having a first setpoint;
- a first flow restrictor in fluid communication with said first relief valve, said first relief valve and said first flow restrictor being in series connection, said first relief valve and said first flow restrictor directing said fluid to said second fluid chamber when said first relief valve actuates;
- a second relief valve in fluid communication with said first fluid chamber, said second relief valve having a second setpoint;
- a second flow restrictor in fluid communication with said second relief valve, said second relief valve and said second flow restrictor being in series connection, said second relief valve and said second flow restrictor directing said fluid to said second fluid chamber when said second relief valve actuates;
- a third relief valve in fluid communication with said second fluid chamber, said third relief valve having a third setpoint; and
- a third flow restrictor in fluid communication with said third relief valve, said third relief valve and said second flow restrictor being in series connection, said third relief valve and said third flow restrictor directing said fluid to said first fluid chamber when said third relief valve actuates;
- whereby an impact of sufficient force to actuate one of said first, second, and third relief valves applied in either direction along a longitudinal axis of said piston rod forces said fluid to flow between said first and second fluid chambers.

14. The apparatus of claim 13 wherein said first relief valve, said first flow restrictor, said second relief valve, and said second flow restrictor are incorporated into a single valve assembly.

15. The apparatus of claim 14 wherein said single valve assembly includes a piston, a spring, and a staged outlet port, said staged outlet port allowing a rate of fluid flow to vary in relation to a pressure of said fluid.

16. The apparatus of claim 14 wherein said single valve assembly includes a piston, a spring, and an outlet port, said outlet port having a main outlet channel and a slot, said slot being exposed to said fluid from an inlet port before said main outlet channel is exposed to said fluid as a pressure of said fluid increases.

17. The apparatus of claim 13 wherein said first relief valve, said first flow restrictor, said second relief valve, and said second flow restrictor are incorporated into a first single valve assembly; and said third relief valve and said third flow restrictor are incorporated into a second single valve assembly.

18. The apparatus of claim 17 wherein each of said first and second single valve assembly includes a piston, a spring, and an outlet port, each one of said outlet ports having a main outlet channel and a slot, said slot being exposed to said fluid from an inlet port before said main outlet channel is exposed to said fluid as a pressure of said fluid increases.

19. The apparatus of claim 13 wherein a seat back of said vehicle is attached to one of said first structural member and said second structural member, said seat back pivotally constrained to move between a forward position and a backward position during said impact by said piston rod.

20. The apparatus of claim 19 further including a seat belt retractor attached to said seat back; said seat belt retractor maintaining a preselected tension on a seat belt regardless of said seat back being in either of said forward position and said backward position, said seat belt retractor having a locking mechanism operable from a remote location.

21. The apparatus of claim 19 further including a seat belt retractor attached to said seat back, said seat belt retractor having a remotely controlled locking mechanism preventing a seat belt from unwinding from said seat belt retractor.

22. The apparatus of claim 19 further including a means for retracting a seat belt for securing a passenger to said seat back.

23. The apparatus of claim 13 wherein a seat back of said vehicle is attached to one of said first structural member and said second structural member, said seat back movable between a forward position and a backward position during said impact, said forward position and said backward position defined by a first stop and a second stop, said first and second stops limiting said seat back from moving beyond said forward position and said backward position.

24. An apparatus for impact dispersal of a force applied to a vehicle, said apparatus comprising:
- a hydraulic cylinder having a piston rod and a first fluid chamber filled with a fluid, said hydraulic cylinder connected to a first structural member of a vehicle and said piston rod connected to a second structural member of said vehicle;
- a first relief valve in fluid communication with said first fluid chamber, said first relief valve having a first setpoint;
- a first flow restrictor in fluid communication with said first relief valve, said first relief valve and said first flow restrictor being in series connection, said first relief valve and said first flow restrictor directing said fluid from said first fluid chamber when said first relief valve actuates;
- a second relief valve in fluid communication with said first fluid chamber, said second relief valve having a second setpoint, said first setpoint being different than said second setpoint; and
- a second flow restrictor in fluid communication with said second relief valve, said second relief valve and said second flow restrictor being in series connection, said first relief valve and said first flow restrictor being parallel to said second relief valve and said second flow restrictor, said second relief valve and said second flow restrictor directing said fluid from said first fluid chamber when said second relief valve actuates;
- a pressurized tank containing said fluid, said pressurized tank in fluid communication with a connection valve that is in fluid communication with said first fluid chamber;
- whereby an impact force applied along a longitudinal axis of said piston rod pressurizes said fluid which escapes said first fluid chamber through said first and second relief valves and at a rate controlled by said first and second flow restrictors.

25. The apparatus of claim 24 wherein said first relief valve, said first flow restrictor, said second relief valve, and said second flow restrictor are incorporated into a single valve assembly.

26. The apparatus of claim 25 wherein said single valve assembly includes a piston, a spring, and a staged outlet port, said staged outlet port allowing a rate of fluid flow to vary in relation to a pressure of said fluid.

27. The apparatus of claim 25 wherein said single valve assembly includes a piston, a spring, and an outlet port, said outlet port having a main outlet channel and a slot, said slot being exposed to said fluid from an inlet port before said main outlet channel is exposed to said fluid as a pressure of said fluid increases.

28. The apparatus of claim 24 wherein a bumper of said vehicle is attached to one of said first structural member and said second structural member.

29. The apparatus of claim 24 wherein a seat back of said vehicle is attached to one of said first structural member and said second structural member, said seat back pivotally constrained to move between a forward position and a backward position during said impact by said piston rod.

30. The apparatus of claim 24 wherein said hydraulic cylinder further includes a second fluid chamber filled with said fluid, said hydraulic cylinder being a double-acting cylinder whereby movement of said piston rod acts on said first and second fluid chambers; said apparatus further including a third relief valve and a third flow restrictor in series communication, said third relief valve having a third setpoint, said third relief valve and said third flow restrictor directing said fluid to said first fluid chamber from said second fluid chamber when said third relief valve actuates; said first relief valve and said first flow restrictor directing said fluid to said second fluid chamber; and said second relief valve and said second flow restrictor directing said fluid to said second fluid chamber.

31. The apparatus of claim 24 wherein said vehicle is a carrier subject to a dropping force, one of said first and second structural members being a footer upon which said carrier rests after being subject to said dropping force.

* * * * *